United States Patent [19]

Leenhouts

[11] 4,027,222
[45] May 31, 1977

[54] MANUAL CONTROL IN A MOTION CONTROL SYSTEM

[75] Inventor: Albert C. Leenhouts, Harwinton, Conn.

[73] Assignee: The Superior Electric Company, Bristol, Conn.

[22] Filed: July 14, 1975

[21] Appl. No.: 595,534

[52] U.S. Cl. .................................. 318/591; 318/685
[51] Int. Cl.² ............................................ G05B 7/00
[58] Field of Search .......... 318/591, 685, 571, 603; 235/150.3, 150.31, 151.11

[56] References Cited

UNITED STATES PATENTS

| 3,510,683 | 5/1970 | Rotier | 318/591 X |
| 3,617,715 | 11/1971 | Dummermuth | 235/151.11 |
| 3,725,762 | 4/1973 | Levesque | 318/591 |
| 3,772,602 | 11/1973 | Kobayashi | 318/591 X |
| 3,908,195 | 9/1975 | Leenhouts | 318/696 X |
| 3,940,593 | 2/1976 | Bleak | 318/591 X |
| 3,949,286 | 4/1976 | Appelgren | 318/571 |

Primary Examiner—Robert K. Schaefer
Assistant Examiner—John J. Feldhaus
Attorney, Agent, or Firm—Ernest M. Junkins

[57] ABSTRACT

A motion control system in which motion is set by the number of whole steps to be produced in consecutive time intervals where the selection for each time interval is from a plurality of different numbers arranged in a sequential progressive order with a manual control causing the system to select numbers for consecutive time intervals from its last selected number sequentially through the order to one alternating repeating number for the lowest speed and a higher number for a maximum speed, in either direction. The system further enables the operator to adjust the rate of the steps in a time interval and the duration thereof, thereby altering motor speed without changing the number of steps in a time interval. When the operator releases control, the system automatically makes the motor assume its stopped, non-moving state.

15 Claims, 3 Drawing Figures

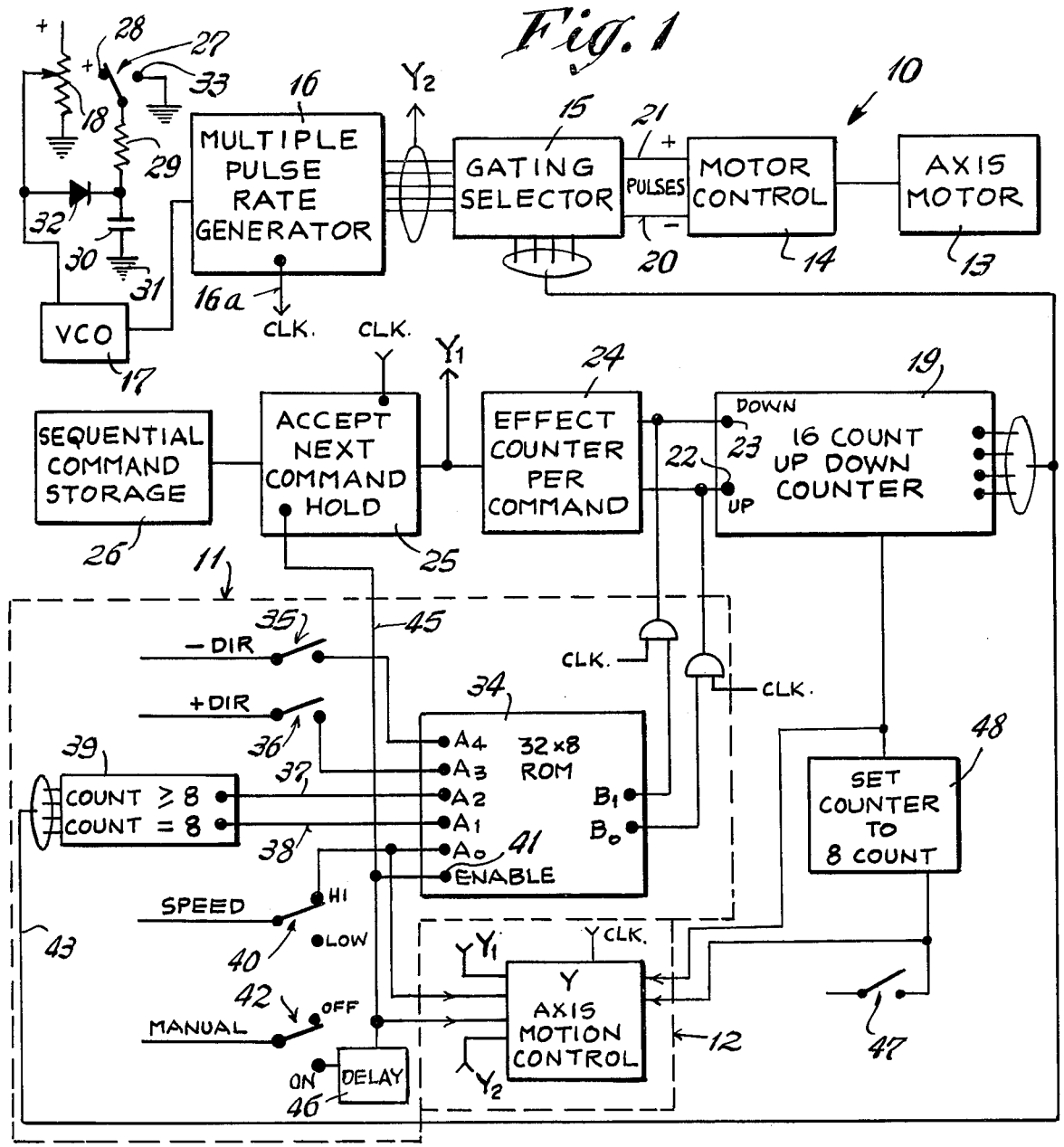

Fig. 3

| A4 | A3 | A2 | A1 | A0 | INPUT # | B0 | B1 | EFFECT |
|---|---|---|---|---|---|---|---|---|
| 0 | 0 | 0 | 0 | 0 | 0 | 0 | 1 | +1 |
| 0 | 0 | 0 | 0 | 1 | 1 | 0 | 1 | +1 |
| 0 | 0 | 0 | 1 | 0 | 2 | 1 | 1 |  |
| 0 | 0 | 0 | 1 | 1 | 3 | 1 | 1 |  |
| 0 | 0 | 1 | 0 | 0 | 4 | 1 | 0 | −1 |
| 0 | 0 | 1 | 0 | 1 | 5 | 1 | 0 | −1 |
| 0 | 0 | 1 | 1 | 0 | 6 | 1 | 1 |  |
| 0 | 0 | 1 | 1 | 1 | 7 | 1 | 1 |  |
| 0 | 1 | 0 | 0 | 0 | 8 | 0 | 1 | +1 |
| 0 | 1 | 0 | 0 | 1 | 9 | 0 | 1 | +1 |
| 0 | 1 | 0 | 1 | 0 | 10 | 0 | 1 | +1 |
| 0 | 1 | 0 | 1 | 1 | 11 | 0 | 1 | +1 |
| 0 | 1 | 1 | 0 | 0 | 12 | 1 | 0 | −1 |
| 0 | 1 | 1 | 0 | 1 | 13 | 0 | 1 | +1 |
| 0 | 1 | 1 | 1 | 0 | 14 | 0 | 1 | +1 |
| 0 | 1 | 1 | 1 | 1 | 15 | 0 | 1 | +1 |
| 1 | 0 | 0 | 0 | 0 | 16 | 0 | 1 | +1 |
| 1 | 0 | 0 | 0 | 1 | 17 | 1 | 0 | −1 |
| 1 | 0 | 0 | 1 | 0 | 18 | 1 | 0 | −1 |
| 1 | 0 | 0 | 1 | 1 | 19 | 1 | 0 | −1 |
| 1 | 0 | 1 | 0 | 0 | 20 | 1 | 0 | −1 |
| 1 | 0 | 1 | 0 | 1 | 21 | 1 | 0 | −1 |
| 1 | 0 | 1 | 1 | 0 | 22 | 1 | 0 | −1 |
| 1 | 0 | 1 | 1 | 1 | 23 | 1 | 0 | −1 |
| 1 | 1 | 0 | 0 | 0 | 24 | 0 | 1 | +1 |
| 1 | 1 | 0 | 0 | 1 | 25 | 0 | 1 | +1 |
| 1 | 1 | 0 | 1 | 0 | 26 | 1 | 1 |  |
| 1 | 1 | 0 | 1 | 1 | 27 | 1 | 1 |  |
| 1 | 1 | 1 | 0 | 0 | 28 | 1 | 0 | −1 |
| 1 | 1 | 1 | 0 | 1 | 29 | 1 | 0 | −1 |
| 1 | 1 | 1 | 1 | 0 | 30 | 1 | 1 |  |
| 1 | 1 | 1 | 1 | 1 | 31 | 1 | 1 |  |
| −X | +X | ≥8 | =8 | HI |  |  |  |  |

MANUAL CONTROL IN A MOTION CONTROL SYSTEM

The present invention relates to enabling manual control of the motion produced in a motion control system such as disclosed in my copending application entitled "Motion Control System and Method for Length Coded Sequential Commands", Ser. No. 542,965, filed Nov. 18, 1974 now U.S. Pat. No. 4,000,451 granted Dec. 28, 1976 and assigned to the assignee of the present invention. In such a length coded system, motion is divided into consecutive time intervals and for each time interval, a whole number of steps to be produced by a motor is selected. As the number of steps in a time interval normally sets the speed of the motion during the time interval, and as the system and especially the motor that produces the steps has a finite ability to change its speed within the duration of the time interval, the difference in the number of steps between adjacent time intervals is kept within a maximum whole number. Preferably the number difference is 1 so that the system limits the number of steps in a time interval from being no more than 1 more, 1 less or the same as the number of steps in the immediately prior time interval. Normally increasing the number of steps accelerates the motor while a decrease effects deceleration.

The above-noted system uses stored commands for controlling the motion with there being a command for each time interval with each command, however, merely indicating if the present time interval is to have 1 step more, 1 step less or the same number of steps as the immediately preceding time interval. If it is desired to produce motion under manual control, the same manner of commanding the change in the number of steps per time interval may, of course, be utilized. However, such manual control over each individual time interval would require extensive skill on the part of the operator, if indeed an operator had the physical dexterity to control each time interval when for example, intervals were of 5 milliseconds duration. Moreover, if the same pattern of change is not followed, then the system is quite apt to malfunction or be quite slow and inefficient.

Further, the system provides for setting the motor speed by being able to adjust the rate at which the pulses are supplied in each time interval.

It is accordingly an object of the present invention to provide a motion control system with a manual control that automatically provides the necessary commands for each time interval to carry out the desired manual commands without exceeding the motor's ability.

Another object of the present invention is to achieve the above object with a manual control that automatically restores the system to a non-moving stopped condition of the motor upon relinquishment of control by an operator.

A further object of the present invention is to enable an operator to stop and resume motion without altering the number of steps in a time interval and also to adjust the rate of the steps in the time intervals within the motor's ability.

Still another object of the present invention is to provide a motion control system with a manual control that enables an operator to select either a minimum number of pulses per time interval or a maximum number, which is reliable in operation, economical to manufacture and easily incorporated into a one or a plural axes motion control system.

In carrying out the present invention, the manual control is disclosed in conjunction with the stored commands motion producing system disclosed in the above-noted application, though if desired, the control may be used independently of the stored command system. The control includes an operable switch which interconnects the manual control and disconnects command of the system by stored commands. Having placed the manual control in command, the operator is then merely required to operate switches to command the desired direction of the motion either forward or reverse and also the speed thereof, either slow or fast.

The system in the absence of any other manual actuation will alter the number of steps in consecutive time intervals from that which it has when receiving the command to that which is demanded by the command with the required difference number between consecutive time intervals. A slow speed is set to produce only 1 step every other interval while a high speed preferably accelerates the motor to the highest number of steps per time interval at which the speed is capable. Each time interval during this high speed operation will then have the maximum number.

Upon releasing manual control, the system automatically incrementally reduces the number of pulses in a time interval to zero so that assurance is obtained that the stored commands will assume command with always the same number of pulses, i.e. none, in the time interval and with the motor stopped.

In addition to being able to select the number of steps in a time interval for either a slow or fast motion, the system further includes a rate control that enables the operator to alter the rate of the steps in a time interval and also the duration of a time interval. With a slow speed setting individual steps are produced with such a long duration between steps that only normal manual dexterity is required to enable stopping the motor at the end of each step. Moreover, even when the motor's speed is reduced or increased by changing the pulse rate, such changes are caused to be within the motor's ability to respond even without changing the number of steps in a time interval.

Other features and advantages will hereinafter appear.

In the drawing:

FIG. 1 is a block and electrical schematic diagram of a motion control system having the manual control of the present invention incorporated therein.

FIG. 2 is a view of a possible arrangement of the manually operated controls.

FIG. 3 is a chart of the different inputs to a memory and the effect thereon on the count of a counter.

Referring to the drawing, FIG. 1, a motion control system for one axis is generally indicated by the reference numeral 10 and includes the components needed for a system that is capable of using either stored commands as described in my above noted application plus the manual control of the present invention with the latter being generally included within a dotted line block 11. There is additionally shown an indication of the manner in which the mutual components for one axis of the motion control system, may be interconnected with similar motion control system, may be interconnected with similar components of another axis shown within a dotted line block 12 to enable an operator to concurrently control two axes. The components of the system 10 are basically disclosed in the above-noted application and include a stepping motor 13 which by way of a motor control 14 produces a step for each of the pulses received from a gating selector 15. The gating selector receives a plurality of different pulse rates from the multiple pulse rate generator 16 by functioning essentially as a counter which subdivides pulses received from a voltage controlled oscillator 17, whose rate may be adjusted by an adjustable resistor 18.

The other input to the gating selector 15 is the present count of a up-down counter 19 having a maximum count of 16. With such a counter and with the pulse rate generator 16 providing seven different rates, for example, rates of 1, 2, 3, 4, 5, 6 and 7 pulses for a time interval of 64 pulses from the oscillator 17, the count of 1 of the counter causes the gating selector to supply the 7 pulse rate to the motor control 14 on the minus or reverse direction lead 20; a count of 7 to cause the 1 pulse rate to be applied on the reverse lead 20; a count of 9 to cause the 1 rate to be applied on the plus or forward direction lead 21 and a count of 15 to produce the 7 rate on the plus lead 21. Accordingly, the counter, as it increases its count from 1 to its maximum 15, will produce pulses or steps by the axis motor from its highest speed in the reverse direction to a zero speed when the counter has a count of 8 to a maximum speed in the forward direction when the counter has a count of 15.

The counter 19 includes an up terminal 22 and a down terminal 23 which are connected to an "effect counter per command" block 24 with a pulse to the down terminal 23 causing the counter to decrement its count by 1 while a pulse on the up terminal causes the counter to increment its count by 1. The block 24 receives its information from an "accept next command" block 25 which in turn, accepts sequentially, commands from a sequential command storage 26. As above noted, in such a system, each command is merely a command to increase the count of the counter, decrease its count or maintain its count for a time interval that exists between clock pulses produced on an output clock lead 16a of the generator 16 with a clock pulse appearing with every 64th oscillator pulses. It should be noted that the duration of a time interval occurring between successsive clock pulses may be altered by changing the rate of the oscillator 17 which changes the duration of the 64 pulses and hence the time interval.

Clock pulses are directed to the "accept next command" block 25, that for each clock pulse, supplies a command to maintain or change the count of the counter for the time interval.

In the above system, the operator is provided with a "slide hold" switch 27 as shown in FIG. 2 and indicated by the same reference numeral in FIG. 1. In its unoperated position, the switch arm engages a plus terminal 28 which through a resistance 29 is connected to a capacitor 30 with the other side of the capacitor being connected to a ground 31. A diode 32 interconnects the resistor-capacitor network to the voltage terminal that controls the rate of the oscillator 17.

With this construction and with the slide hold button being unoperated, the voltage applied to the oscillator 17 is that set by the adjustable rate control 18. However, if the switch 27 is operated, a contact 33 is engaged which is grounded and the voltage to the VCO 17 decreases at a rate determined by the resistor 29 and capacitor 30 values. This in turn causes a gradual decrease in the oscillator pulse rate, and the rate of the decrease is made to be within the motor's ability to decellerate. When the oscillator pulse rate becomes effectively zero, the motor is stopped and neither the count of the counter 19 has been altered nor has the next command been prevented from being accepted by the block 25. Thus, operation of this button to stop the motor maintains motor movement in accordance with the stored (or other) commands.

Upon the operator desiring the system to again produce motion, the switch 27 is released and the oscillator 17 increases its pulse rate by the voltage increasing at a rate which again is within the motor's ability to accelerate. Thus, by operation of the slide hold switch 27, an operator can stop motion movement without loss of any motion that is commanded by the stored commands. Of course, it will also be appreciated that the manual adjustable rate control 18 may also be used by an operator to effectively slow the motor movement, again without loss of commanded motion.

The manual control included within the dotted block 11 includes a programmed 32 × 8 memory 34 connected to have two outputs having an input terminal A4 connected to a − direction switch 35; a terminal A3 connected to a + direction switch 36; a terminal A2 connected to a lead 37; a terminal A1 connected to a lead 38 with both leads 37 and 38 beginning within a block 39 and an input terminal A0 connected to a hi contact of a speed switch 40 that normally has its contact arm engage its other low terminal. In addition, an enable terminal 41 is connected to an on contact of a manual switch 42 which normally engages its off contact.

A lead 43 connects the output of the counter 19 as an input to the block 39 so that the lead 37 has a 1 state whenever the counter count is equal to or greater than 8 while the lead 38 has a 1 state only when the counter count is 8.

The memory output appears at two terminals, B1 and B0, with terminal B1 being connected to the down terminal 23 of the counter and the terminal B0 being connected to the up terminal 22. Each connection includes an AND gate that is also connected to receive a clock pulse as an input.

Further connections include a lead 44 connected between a hold terminal 45 in the accept next command block and the on terminal of the manual switch 42. Energization of the terminal 45 stops the block 25 from accepting further stored commands which occurs when the manual control is actuated.

Shown in FIG. 3 is the manner in which the memory 34 is programmed. The first five vertical columns are each denoted by the terminals A4–A0 and represent the input binary state of the terminals with a binary 1, if the statement is true and a binary 0, if the statement is false. The output states for the terminals B0 and B1 are also indicated for each of the possible input conditions and another column entitled "effect" is shown with a plus 1 indicating that for the binary statements horizontally aligned therewith, the effect is a plus 1 incrementing of the counter count while a minus 1 indicates a decrementing of the counter count by 1. If there is to be no change in the counter count, then a blank appears in the effect column. For convenience there is also supplied a column entitled input number for enabling ready reference to the statement of conditions that exist.

With the above construction of the manual control of a motion system, when the counter count is 8, the motor 13 is stopped, and assuming for convenience that there are no stored commands being supplied, if the operator desires to manually control the motor 13 to produce a low speed movement in the plus X direction then the operator actuates switch 42 and switch 36. This produces condition 14 as −X is 0, +X is 1, equals to or greater than 8 is 1, equals 8 is 1 and high is 0, a binary condition of 01110. The counter count will thus increase by 1 to cause the next time interval to have one step. With the same switches being maintained actuated, the next time interval will produce a binary notation of 01100, namely condition 12 which decreases the counter count by 1 to 8 so that for the next time interval the motor will not take a step. However, for the next time interval condition 14 again appears and the motor will take a step. Thus during low speed operation the motor is operated every other time interval to produce one step. The duration of the time interval and hence the time between one step commands may be varied by the operator by changing the frequency of the oscillator 17 by way of the rate adjustable resistor 18 which enables the operator to, in effect, control the speed at which the motor 13 is commanded to produce steps.

If, in the same situation, the count of the counter was less than 8, then condition 8 would occur for each time interval until the counter reached the 8 count at which time the above would be repeated. If the counter count was greater than 8 then condition 12 would occur for each time interval until the counter count reached 9 when the above alternating would be repeated.

For movement in the other direction at low speed wherein switch 35 is actuated with switch 42, again alternate time intervals will have one step by way of condition 22 occurring, then condition 16, then 22, etc. If the count of the counter is less than 7, the condition 16 will increment the counter until the count of 7 is reached wherein again alternate time interval with a pulse will occur. For the condition where a count is greater than 8, it is reduced to 8 by condition 20 for each time interval.

For high speed operation in the +x direction (switches 36, 40 and 42 being actuated) and again with the counter count initially being 0, condition 15 occurs initially then, condition 13 continually repeats incrementing the counter count by 1 for each time interval but it will be understood that once the counter count has reached its maximum it remains there even though condition 13 continually repeats. On the other hand if the counter count is less than 8 initially, condition 9 will increase it to 8, when conditions 15 and 13 sequentially appear. For an initial count greater than 8, condition 13 is effective to increase the count to the maximum desired.

For reverse movement and high speed (switches 35, 40 and 42 being actuated) condition 23 initially appears if the count is 8 and subsequently, condition 17 is continuously repeated. If the initial count is less than 8, condition 17 will repeat for each time interval while if the count is greater than 8 initially condition 21 will reduce the count to 8. Again as mentioned, the actual speed of the motor may be controlled by the setting of the rate switch 18 thus enabling the operator to easily alter the speed to that desired.

Whenever the manual control is relinquished by the operator, the system causes the counter count to be reduced to 8 by increments. Thus assuming that switch 42 remains actuated, but switches 35, 36 and 40 are not actuated and the counter has a count of 9, then the memory input condition is 00100 or condition 4. This decreases the count to 8 where condition 1 maintains the count at 8. For a count of greater than 9, condition 4 will be repeated for each time interval until the count of 8 is reached. Also for any count of 7 or less, condition 0 exists, which causes increasing the count to 8 where it is maintained. Accordingly by having neither direction switch actuated (or both, i.e. conditions 24–31), the system decelerates the motor to a stop where it is maintained.

Generally, the time required for an operator to deactivate either of switches 35 and 36 and then deactivate switch 42, provides sufficient time for the counter to have attained an 8 count. However, to assure that such a short time will be always available, a delay circuit 46 may be included in the connection to the on terminal of switch 42 and used to maintain on energization for a short period after deactivation of the switch 42.

The system further includes a power switch 47 for energizing the system. Again, to assure that the counter will initially have a count of 8, a set to 8 circuit 48 may be connected to be momentarily actuated when the power switch initially energizes the system.

It will be noted that the slide hold switch 27 is operable to control the pulse rate irrespective of whether motion is by stored commands or controlled manually.

While the above describes operation of the manual control for one axis, the system may be used to also control a second or Y axis. Thus the same components as in the block 11 would be needed and connections thereto would include $Y_2$ from the generator 16, the clock pulse terminal, $Y_1$ from the block 25 for Y axis stored commands and connections to the on terminal of switch 42, the hi terminal of switch 40, the power switch 47 and the set to 8 block 48. Additionally individual connection would be made from axis direction switches 49 and 50.

It will accordingly be understood that there has been disclosed a manual control for a motion system which assures that when the system is being operated by an operator, that the motor will only be moved at rates within its ability. The system enables an operator to control direction of movement, at high or low speeds, and at an adjustable rate. Further the system is returned to being commanded by stored commands with the motor being assuredly commanded to be in its stopped condition.

Variations and modifications may be made within the scope of the claims and portions of the improvements may be used without others.

I claim:
1. A manual control system for a digital motion system of the type having successive time intervals with a whole number of pulses being supplied in a time interval and with each pulse producing a digital movement comprising means for supplying pulses at a progressively increasing number of pulses per time interval, operable means for exclusively directing manual control of the digital motion, means for sensing the number of pulses in the initial time interval after operation of the operable means, actuatable means which upon actuation commands a number of pulses per time interval, means for changing the number of pulses in subsequent time intervals from the initial number to the commanded number of pulses in accordance with the progression of the numbers in the means for supplying with each different number in the progression appearing in a different time interval and in which the actuatable means normally commands a zero number of pulses in a time interval in the absence of actuation.

2. The invention as defined in claim 1 in which there are means for producing a time interval having zero pulses upon the release of the direction of digital motion by the manual control.

3. The invention as defined in claim 1 in which the system has produced a time interval having the commanded number and in which the actuation means includes means upon deactuation for changing the number of pulses in subsequent time intervals from the commanded number to zero in accordance with the inverse of the progression of the numbers in the means for supplying with each different number in the progression appearing in a different time interval.

4. The invention as defined in claim 3 in which the means for directing manual control includes means for maintaining control of the digital motion until there is a time interval having a zero number of pulses.

5. The invention as defined in claim 1 in which the actuatable means includes low speed means for directing a low speed by producing no more than one step in a time interval.

6. The invention as defined in claim 5 in which the low speed means includes means for producing alternate time intervals with one step and intermediate time intervals with zero steps.

7. The invention as defined in claim 1 in which the actuating means includes high speed means for directing a high speed by commanding a large number of steps for each time interval.

8. The invention as defined in claim 7 in which the system has a maximum number of steps per time interval and in which the fixed number is the same as the maximum number.

9. The invention as defined in claim 1 in which there is at least one intermediate time interval during manual controlled motion which has a plurality of steps and in which the actuation means upon cessation of actuation causes each time interval thereafter to have a lesser number of steps.

10. The invention as defined in claim 1 in which the actuation means includes a first means for commanding motion in one direction and a second means for commanding motion in the other direction.

11. The invention as defined in claim 10 in which the actuation means includes means requiring the first and second means to be exclusively actuated to effect motion in the direction of the actuated first or second means.

12. The invention as defined in claim 11 in which the actuation means includes means for reducing the number of pulses per time interval towards zero upon simultaneous identical actuation of the first and second means.

13. The invention as defined in claim 1 in which there are adjustable means for adjusting the duration of the time intervals without altering the number of pulses in each time interval.

14. The invention as defined in claim 13 in which there is an actuatable stopping means and means interconnecting the stopping means with the adjustable means for automatically causing the adjustable means to increase the duration of successive time intervals at a preselected rate upon energization of the stopping means.

15. The invention as defined in claim 14 in which the interconnecting means, upon deenergization of the stopping means, automatically causes the adjustable means to decrease the duration of successive time intervals to the selected duration set by the adjustable means.

* * * * *